March 27, 1945. C. H. KEAN 2,372,582
MEANS OF TRANSMITTING INFORMATION
Filed Nov. 2, 1940     3 Sheets-Sheet 2

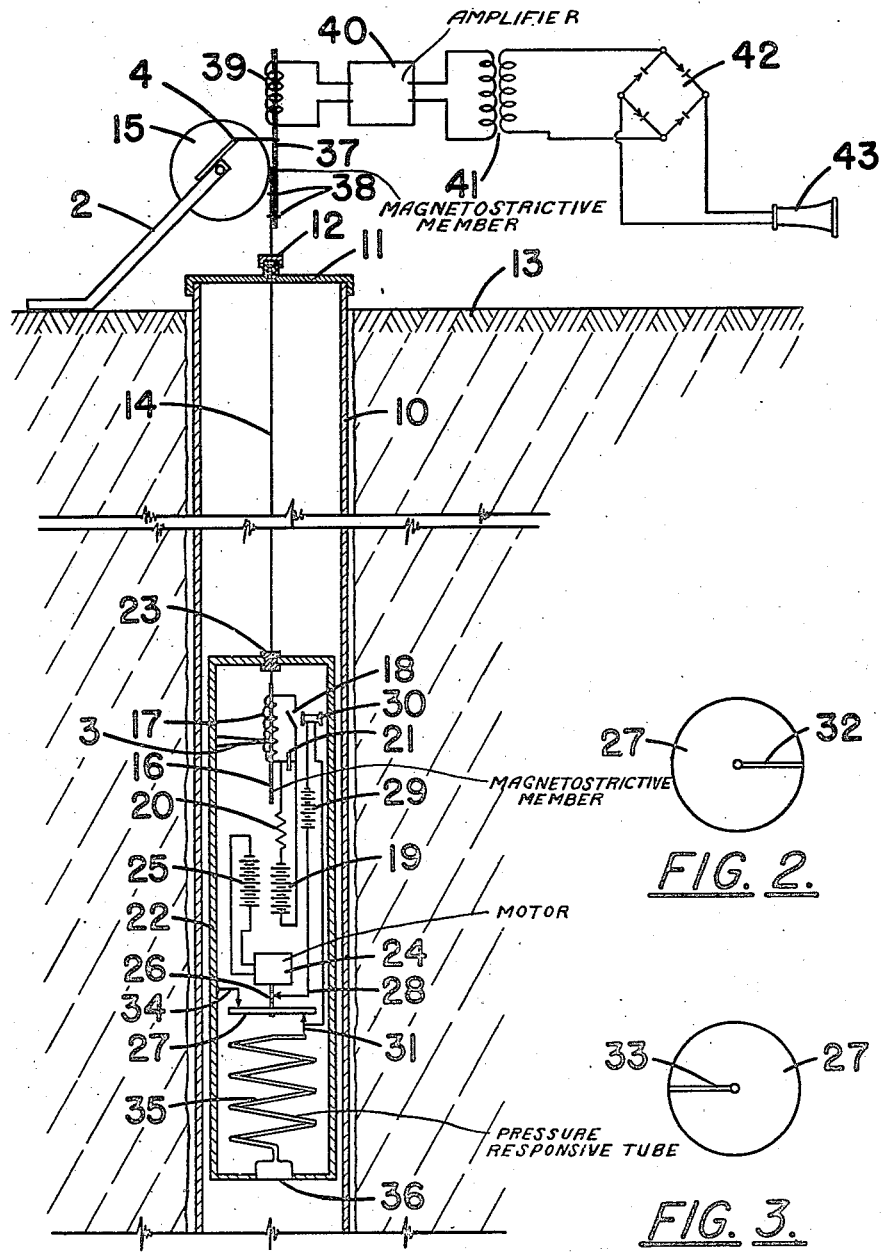

Clare H. Kean INVENTOR.
BY P. J. Whelan
ATTORNEY.

March 27, 1945.   C. H. KEAN   2,372,582
MEANS OF TRANSMITTING INFORMATION
Filed Nov. 2, 1940   3 Sheets-Sheet 3

Clare H. Kean INVENTOR.
BY P. J. Whelan
ATTORNEY.

Patented Mar. 27, 1945

2,372,582

UNITED STATES PATENT OFFICE 2,372,582

MEANS OF TRANSMITTING INFORMATION

Clare H. Kean, Houston, Tex., assignor to Standard Oil Development Company, a corporation of Delaware Application November 2, 1940, Serial No. 364,024

6 Claims. (Cl. 73—151)

The present invention is directed to the transmission of signals through an elastic medium.

It is an object of the present invention to set up high frequency acoustic vibrations in a wire line and to convey measurements or signals by means of these vibrations.

It is another object of the present invention to transmit signals from a temperature indicating device suspended in a bore hole by a wire line through said wire line to the surface of the earth.

It is a further object of the present invention to transmit signals from a pressure indicating device suspended by a wire line through said wire line.

Other objects and advantages of the present invention will be seen from a reading of the following description taken with the accompanying drawings in which Fig. 1 is a diagrammatic view showing one modification of the present invention arranged with a pressure indicating portion suspended in a bore hole and with the receiving portion arranged at the surface of the earth;

Figs. 2 and 3 are views of portions of the apparatus illustrated in Fig. 1;

Figure 4:
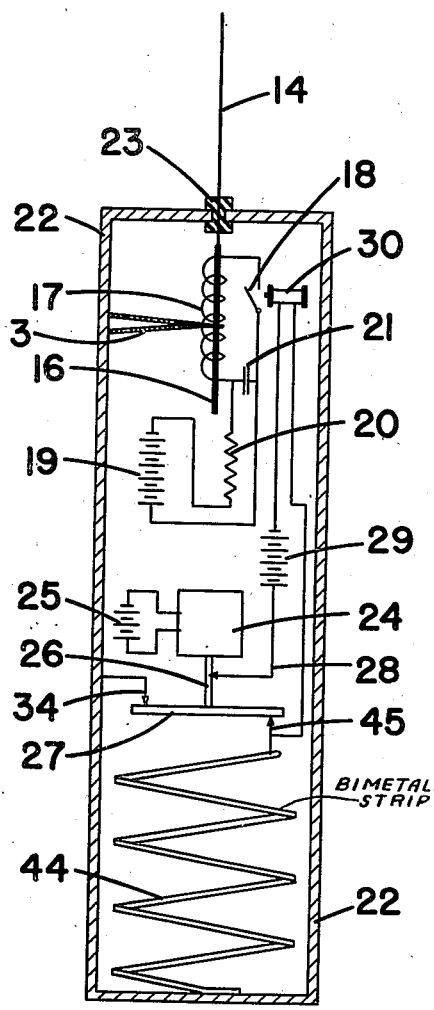
Fig. 4 is a diagrammatic view showing a portion of another modification of the present invention.

Referring specifically to the drawings and first to Fig. 1, a casing 10 arranged in a borehole has its upper end provided with a cap 11 in which there is an opening controlled by a stuffing box 12. The surface of the earth is indicated by numeral 13. A wire line 14 arranged to cooperate with stuffing box 12 to make a tight joint is arranged on a reel or hoist 15 provided with support 2.

Firmly fastened to the lower end of wire line 14 is an elongated piece of strongly magnetostrictive substance 16. It is preferred to use a nickel tube for unit 16, but other shapes of bodies and other strongly magnetostrictive materials, such as cobalt-nickel alloy, may be used. Surrounding the strongly magnetostrictive unit 16 is a coil of wire 17, the ends of which are connected by a circuit including an electromagnetically operated switch 18, battery 19, resistance 20, and condenser 21. This circuit is all arranged within a case 22, having an opening in its upper end through which the wire line 14 may pass before it is connected with magnetostrictive unit 16, the annular space between the upper end of the case and the wire line 14 being closed by a rubber gasket 23.

To maintain magnetostrictive unit 16 in position, retaining member 3 extends from casing 22 to the center portion of the magnetostrictive unit. This is the preferred method of positioning the magnetostrictive unit because the ends of the unit are left free to vibrate. Other methods of retaining member 16 in position may be resorted to, however; for example, the retaining member may be attached to one end of the member leaving the remainder free to vibrate.

Also arranged within casing 22 is an electric motor 24 electrically connected to battery 25 to cause rotation of the motor. Connected to the shaft 26 of the motor is a disk 27 which is thereby rotated by the motor. The disk 27 will be more fully described later.

A conductor 28 makes contact with shaft 26 of the motor and is electrically connected to a circuit which includes battery 29, and solenoid 30 which connects to the pointer 31 which will be hereafter more fully described. A top view of disk 27 is illustrated in Fig. 2. As indicated in the drawings, the disk 27 is composed of insulating material and has its upper surface provided with a single radial conductor 32 electrically connected to drive shaft 26. In like manner, the lower portion of the disk, a view of which is shown in Fig. 3, is provided with a single radial conductor 33 which extends from the circumference to the center of the disk and makes an electrical contact with the shaft 26. A conductor 34 electrically connected to the case 22 is provided to make contact with the upper surface of disk 27.

Arranged in the lower portion of case 22 is a pressure responsive tube 35 having one end closed with pointer 31 attached thereto and the other end attached to casing 22 and provided with a diaphragm 36, whereby exterior pressure may be transmitted into the interior of the tube.

At the other end of wire line 14 is clamped a piece of magnetostrictive material 37, preferably a nickel tube similar to unit 16, by means of clamps 38. Magnetostrictive member 37 is provided with a retaining member 4 extending from support 2 to the center portion of the member.

It may be pointed out that members 16 and 37 should be supported in the same manner, so that they will vibrate in a corresponding manner and since 16 has its center fixed in position with its ends free to vibrate, 37 should be supported in a corresponding manner.

A solenoid 39 is arranged over a portion of the strongly magnetostrictive material 37 and is electrically connected to alternating current amplifier 40. Alternating current amplifier 40 is, in turn, electrically connected to a step down transformer 41 which, in turn, is connected to bridge rectifier 42 which has connected across it the telephone receiver 43. Transformer 41 and bridge rectifier 42 together serve to rectify and demodulate the signals received.

The apparatus illustrated in Fig. 1 operates in the following manner. The motor continually rotates disk 27 as the device is lowered into the bore hole. As the device is being lowered, it is necessary that element 37 be removed from the wire line in order that the wire line pass through stuffing box 12.

When it is desired to take a reading, the downward movement of the device must be stopped and the element 37 clamped on the wire line. As disk 27 rotates, two signals are transmitted to the surface during every revolution. When contact strip 33 of disk 27 touches pointer 31, the electrical circuit including battery 29 and solenoid 30 is completed, which, in turn, closes switch 18. The closing of the switch allows the condenser 21 to discharge which produces a train of vibrations in magnetostrictive unit 16 which are transmitted by wire line 14. The vibrations transmitted by the wire line are communicated to strongly magnetostrictive unit 37 and change the magnetic properties of this material, inducing an electrical pulse in solenoid 39 which is, in turn, transmitted to alternating current amplifier 40, then step down transformer 41 and rectifier 42 so that a signal is transmitted to telephone receiver 43 and may be heard by an operator. As the disk 27 continues to operate, the strip 32 comes in contact with pointer 34 which, in turn, transmits another signal by wire line 14 which appears at the surface of the earth. It will be apparent that a change in the pressure acting on diaphragm 36 will cause the end of tube 35 to move, changing the position of pointer 31, with respect to the circumference of disk 27, thereby producing a change in the time interval between the consecutive signals produced by contact of pointer 31 with contact strip 33. The signals produced by contact of pointer 34 with contact strip 32 occur at uniformly recurring intervals and accordingly act as reference points. A change in pressure acting on diaphragm 36 will accordingly not only change the time interval between consecutive pulses produced by contact between pointer 31 with strip 33 while pointer 31 is in motion but will also cause a shift in the time interval between the pulse produced by pointer 31 and that produced by pointer 34. It may be possible to omit pointer 34 and strip 32 from the device, and operate it without the uniformly recurring signal produced by these units, but more satisfactory results are obtained by using uniformly recurring reference signals in addition to the indicating signals. After a reading at one point in the borehole has been taken, the magnetostrictive bar 37 may be unclamped from the wire line and the device lowered until another reading is desired, when element 37 is again clamped onto the wire line and another reading is taken.

In Fig. 4 is illustrated a fragmental view of the signalling device arranged to be attached to the wire line 14 for transmitting temperature variations in the bore hole. It will be seen that this modification of the invention differs from that shown in Fig. 1 only in that a bimetallic strip 44 has been substituted for the Bourdon tube 35 shown in Fig. 1. In the device shown in Fig. 4 the bimetallic strip 44 changes the position of contact 45 in response to the temperature to which it is subjected. The receiving device for the signals emitted by this modification of the invention is exactly the same as that shown by Fig. 1 and for this reason has not been again illustrated.

Figure 5:
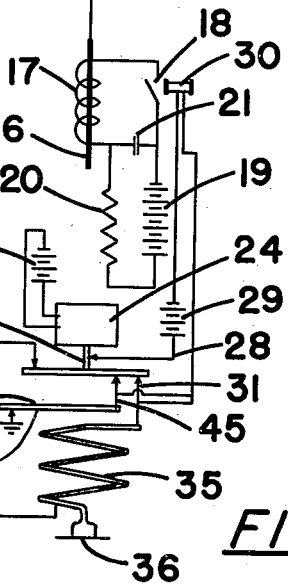
Fig. 5 is a diagrammatic illustration of another modification of the present invention.

Fig. 5 illustrates another modification of the present invention arranged for the transmission of both pressure and temperature indications to the surface of the earth. It will be seen that this apparatus is provided both with a bimetallic strip 44 and a pressure responsive tube 35, bimetallic strip 44 carrying stylus 45 which makes contact with the rotating disk 27, while tube 35 carries stylus 31 which makes contact with the rotating disk 27. The receiving apparatus shown by this modification including amplifier 40 to which is electrically connected a rectifier and demodulator 46 which, in turn, is connected to ticker tape apparatus 47. The signals transmitted by this apparatus are conveyed to the ticker tape apparatus which records them in a code.

One method of transmitting signals to the surface whereby the several measurements taken may be totally distinguished is by the use of multiple conducting strips on the rotating disk 27. For example, in the modification shown in Fig. 5, the upper surface of rotating disk 27 is the same as that shown in Fig. 1 and specifically illustrated in Fig. 2. The lower surface of the rotating disk 27 may, however, be provided with triple conductors 49 which extend radially from the center of the disk, but do not extend entirely to the circumference, and the double conductors 48 which begin at the circumference of the disk, but do not extend entirely to the axis thereof. Stylus 45 mechanically connected to bimetallic strip 44 is arranged to make electrical contact with conductors 49, while stylus 31 mechanically connected to the Bourdon tube 35 is arranged to make electrical contact with double conductors 48, but not with the triple conductors 49. Both conductors 49 and 48 are electrically connected to the shaft 26 by which the disk is rotated.

Figure 7:
Fig. 7 is a view of a typical record which may be obtained with the apparatus shown in Fig. 3.
Figure 6:
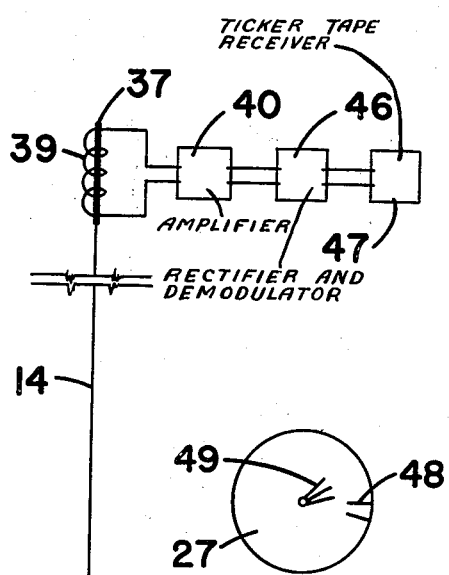
Fig. 6 is a view of a portion of the apparatus shown in Fig. 5.

A typical record which may be obtained from the device illustrated in Fig. 5 appears in Fig. 7. The double notch designated by numeral 50 indicates the contact of stylus 31 with double conductors 48, while the single point of 51 illustrates the point of contact of stylus 34 with conductor 32 which serves as the reference point for the readings. The triple notch designated by numeral 52 illustrates the contact of stylus 45 with triple conductors 49. It will be evident as the temperature and pressure conditions to which the pressure responsive tube and the bimetallic strip are subjected change, the distance between the various indications appearing on the tape, as illustrated in Fig. 7, changes, thereby indicating the pressure and temperature changes to which the apparatus is subjected.

Figure 8:
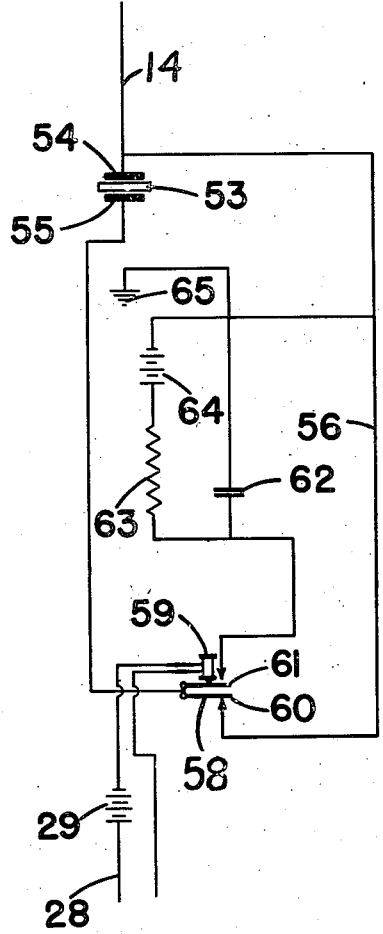
Fig. 8 is a fragmentary view of a portion of the wiring diagram which may be substituted for a portion of the apparatus shown in Fig. 3.

While I have described only the production of high frequency waves in a line by means of a strongly magneto-strictive material, other means for producing such frequencies may also be employed. For example, one may use a piezo-electric crystal for producing these vibrations. Such a modification is illustrated in Fig. 8. As shown in this figure, a piezo-electric crystal 53 is cemented between metal plates 54 and 55. Metal plate 54 is connected to the end of wire line 14. Electrical conductor 56 is arranged to connect plate 54 with plate 55 through switch 60, when the switch is in its closed position. Switch 60 is operated by current flowing in conductor 28 through a solenoid 59 in the same manner that magnetically operated switch 18 was controlled by current flowing in solenoid 30 in the previously illustrated modifications.

Conductor 28 is connected to the rotating disk 27 and to suitable styli arranged on measuring instruments, such as bimetallic strips, and Bourdon tubes, as shown in the previous figures. The rotating disk causes momentary pulses of current which flow through solenoid 59, causing switch 60 to open and switch 61 to close.

An electrical circuit including condenser 62, resistance 63, and battery 64 connected to ground 65, is arranged with an electrical connection to conductor 56 and another to a fixed contact of switch 61. When switch 61 is open condenser 62 receives a charge, which may be discharged by closing switch 61.

In operation a pulse of current through solenoid 59 causes switch 61 to close and allows a charge of current to be transmitted to plate 55 which, in turn, causes a high frequency pulse to be transmitted by piezo-electric crystal 53 to wire line 14. As soon as the current pulse in solenoid 59 is terminated, switch 61 opens and switch 60 closes, connecting plates 53 and 54 to ground 65, thereby discharging them and preparing the piezo-electric crystal to receive another pulse. Pulses transmitted by this device may be received at the surface of the earth with exactly the same type of apparatus illustrated in the previous modifications.

The apparatus illustrated in the preceding figures is particularly useful for transmitting information along a wire line. Wire lines are frequently used in the oil industry for lowering equipment into oil wells, one of the most popular lines being, for example, a single wire of steel, approximately 1/16" in diameter. When such a line is used in lowering the equipment in the well, signals may be readily transmitted to the surface of the earth. However, on occasion, it may be desired to resort to other means for attachment of the equipment. For example, it may be desirable to lower suitable equipments by means of sucker rods or drill pipe. If such is desired, the means previously described may be used for transmitting signals by these elastic rods.

Figure 9:
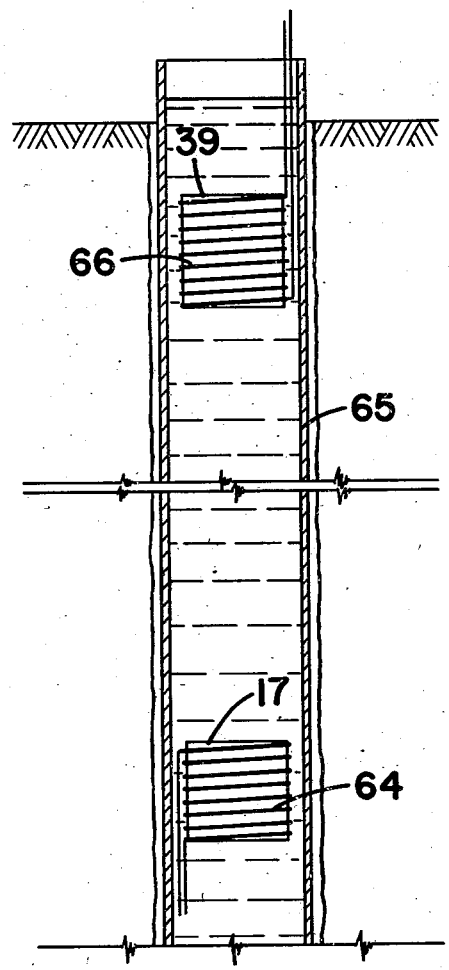
Fig. 9 is a fragmentary view showing another arrangement of the apparatus.

On some occasions, it may be desirable to transmit a signal to a column of liquid rather than through an elastic metal body. For example, it may be desirable to transmit the signal through the column of liquid retained by a casing, or a string of tubing, instead of by the string of tubing itself. If such is desired, the equipment may be suitably arranged for carrying out such a transmission. The fragmentary view of apparatus suitable for this purpose is shown in Fig. 9. In accordance with this figure, a strongly magnetostrictive body 64 is arranged within the lower end of the tubing 65, but out of contact therewith. Magnetostrictive body 64 is arranged within a solenoid 17 which may be connected with any of the electrical circuits illustrated in Figs. 1, 4 or 5. In the upper end of the tubing, but out of contact therewith is arranged magnetostrictive body 66 surrounded by solenoid 39 which may be electrically connected to the circuits illustrated in Fig. 1 or 5. In this modification of the present invention the frequencies set up in the magnetostrictive body 64 are transmitted to the column of fluid above it, and this column of fluid transmits the frequencies to the strongly magnetostrictive body 66 where, in turn, they may pass to suitable receiving means. This modification may be used for transmitting pressure and temperature indications in the devices previously illustrated.

While I have shown specific modifications of the present invention, it is not my intention to be limited to these specific modifications, but to claim the invention as broadly as the prior art permits. For example, while pressure and temperature are the characteristics within a bore hole which it is most frequently desired to obtain, other characteristics such, for example, as the velocity of the flowing fluid therein may be desired. It will be apparent to the skilled worker that the equipment above described may be modified to transmit other signals than those specifically disclosed.

Having fully disclosed the present invention, what I desire to claim is:

1. Apparatus for transmitting signals comprising, in combination, a metallic cable, two bodies constructed of strongly magnetostrictive material arranged in physical contact to said metallic cable and widely separated from each other, a solenoid surrounding each of said strongly magnetostrictive bodies, an electrical circuit connected to one of said solenoids provided with means for producing a signal a function of which varies with changes in a value to be transmitted, and an electrical circuit connected with said other solenoid having arranged therein means for receiving and modifying the signal through said metallic cable, and means for displaying said modified signal to an operator.

2. Apparatus for geophysical prospecting comprising, in combination, a container adapted to be moved along the bore of a well, a metallic cable adapted to suspend said container with the lower end of the cable extending into the container and the upper end of the cable adapted to remain at the surface of the earth, a means in the container and attached to the lower end of the metallic cable for transforming electrical oscillations into mechanical oscillations, an electrical circuit including a switch, said circuit being arranged to oscillate electrically upon the operation of said switch and arranged to co-operate with said means to set up mechanical oscillations therein upon operation of the switch, a motor including a drive shaft arranged in the container, a conducting element mechanically secured to the drive shaft for rotation therewith with at least one boundary line of the conducting element extending radially with respect to the drive shaft, a member responsive to physical conditions adjacent the container mounted in the container, a second conducting element mounted on the member responsive to physical conditions and arranged to touch the first conducting element upon each rotation of the drive shaft and to move circumferentially with respect to the radial boundary of said first conducting element of changes in the physical conditions adjacent the container to which the member is responsive, means electrically connecting the first conducting element and the second conducting element including a coil arranged to co-operate with the switch to operate the switch upon changes in the magnitude of current flowing through the coil and a source of direct current in series with said coil.

3. Apparatus for geophysical prospecting comprising, in combination, a container adapted to be moved along the bore of a well, a metallic cable adapted to suspend said container with the lower end of the cable extending into the container and the upper end of the cable adapted to remain at the surface of the earth, a means for transforming electrical oscillations into mechanical oscillations arranged within the container and attached to the lower end of the metallic cable, an electrical circuit including a switch arranged to oscillate electrically upon the operation of the switch and to cooperate with said means to set up mechanical oscillations therein upon oscillating electrically, a motor including a drive shaft arranged in the container, a non-conducting disc mounted on the drive shaft for rotation therewith, a first conducting element mounted on one face of the disk with one edge of the element extending radially with respect to the drive shaft, a member responsive to a physical condition adjacent the container mounted in the container, a second conducting element mounted on said member and arranged to come in contact with the first conducting element upon each rotation of the disk and to move circumferentially with respect to the radial edge of the first conducting element upon changes in the physical condition adjacent the container to which the member is responsive, means electrically connecting the first conducting element with the second conducting element including a coil arranged to co-operate with the switch to operate it upon changes in the magnitude of current flowing through the coil and a source of direct current in series with the coil.

4. A device in accordance with claim 3 in which the member responsive to a physical condition adjacent the container is responsive to temperature changes adjacent the container.

5. A device in accordance with claim 3 in which the member responsive to a physical condition adjacent the container is responsive to pressure changes adjacent the container.

6. A device in accordance with claim 3 provided with a receiving means adapted to be arranged at the surface of the earth and including a magnetostrictive member attached to the metallic cable at the surface of the earth and a solenoid arranged to surround at least a portion of said magnetostrictive member.

CLARE H. KEAN.